Nov. 9, 1965   G. A. ULRICH   3,216,521
ADJUSTABLE STEERING WHEEL

Filed July 11, 1963   5 Sheets-Sheet 1

GLENN A. ULRICH
INVENTOR

BY John L. Faulkner
Stuart Lubitz
ATTORNEYS

Nov. 9, 1965  G. A. ULRICH  3,216,521
ADJUSTABLE STEERING WHEEL
Filed July 11, 1963  5 Sheets-Sheet 2

GLENN A. ULRICH
INVENTOR

BY John L. Faulkner
Stuart Lubitz
ATTORNEYS

GLENN A. ULRICH
INVENTOR

BY John L. Faulkner
Stuart Lurbitz
ATTORNEYS

United States Patent Office 3,216,521
Patented Nov. 9, 1965

3,216,521
ADJUSTABLE STEERING WHEEL
Glenn A. Ulrich, Garden City, Mich., assignor to Ford Motor Company, Dearborn, Mich., a corporation of Delaware
Filed July 11, 1963, Ser. No. 294,285
12 Claims. (Cl. 180—78)

This invention relates to an adjustable steering column or wheel that can be moved axially or vertically by a power means.

In recent years the silhouette of the automotive vehicle has become lower. The vehicle has also become more compact. With these changes, space and passenger comfort have become a more critical problem. One aspect of the space and comfort problem, the ease of access into these compact streamlined vehicles, has become an important problem. The concern with this problem is evidenced by the recent patent activity in this area, as shown in U.S. Patent 2,836,988 issued to H. A. Cashman on June 3, 1958 and U.S. Patent 3,078,945 issued to S. Frey on February 26, 1963.

The instant invention is dedicated to the solution of the access problem. This problem is solved by providing a steering wheel or steering column that is automatically moved to a position that does not interfere with the operator's entrance or departure from the vehicle. In addition to solving this problem, the invention provides a power means and control means for selecting the position of the steering wheel or steering column to suit the particular characteristics of the vehicle operator. This selectability enables the operator to comfortably steer the vehicle. Once an operator has selected a steering wheel position, this position will be stored in a memory portion of a control circuit. When the ignition is turned off or some other manual switch operated prior to the operator's departure from the car, the steering wheel will automatically move to a remote position. When the operator returns to the vehicle and turns the ignition switch on or operates some other manual switch the steering wheel will again assume the position that he previously selected.

In addition to the powerized selectability and the automatic movement, the steering wheel of the instant invention is so designed that it appears to float in front of the dashboard. The construction that gives rise to this floating appearance is also adapted to have other controls mounted thereon that may be selectively positioned with the steering wheel. The floating construction also provides a certain flexibility in the steering column construction. This flexibility functions as a safety feature that may aid in maintaining the operator in position in a nonviolent manner during a collision.

The general object of this invention is to provide a steering column having the above described features.

Another object of this invention is to provide an adjustable steering wheel column that is adjustable horizontally and vertically and that may be operated by a power means.

Another obejct of this invention is to provide a steering wheel or steering column that may be selectively moved to a number of positions by manipulating a finger tip control.

Another object of this invention is to provide a steering column or steering wheel that automatically moves to a position remote from the operator when a device senses that the operator is about to alight from the vehicle and that automatically returns the steering column or wheel to a selected position when the operator re-enters the vehicle and is seated.

Another object of the invention is to provide an automatically and selectively positioned surface for other vehicle controls.

Another object of this invention is the provision of a floating steering wheel construction that has a built-in safety feature.

Other objects and advantages will become apparent when the specification is read in conjunction with the drawings wherein.

Figure 1:
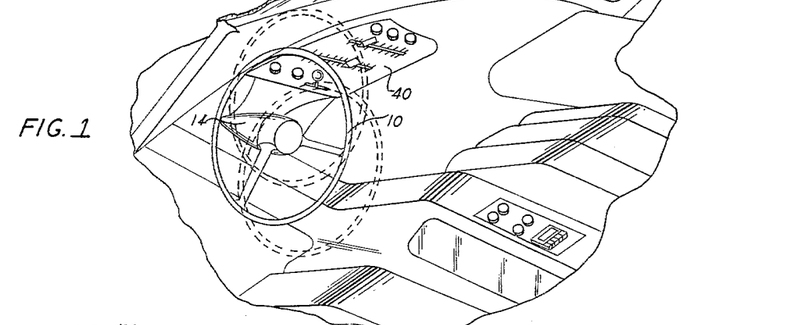
FIGURE 1 is a perspective drawing of a portion of the driver compartment with the movement of the steering wheel being shown in broken lines.
Figure 2:
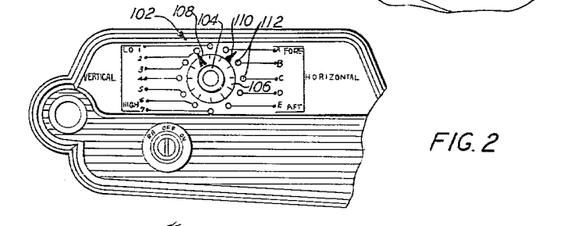
FIGURE 2 is a drawing of a portion of the dashboard having the selector switch or manual control means that enables the position of the steering column or wheel to be selected.
Figure 3:
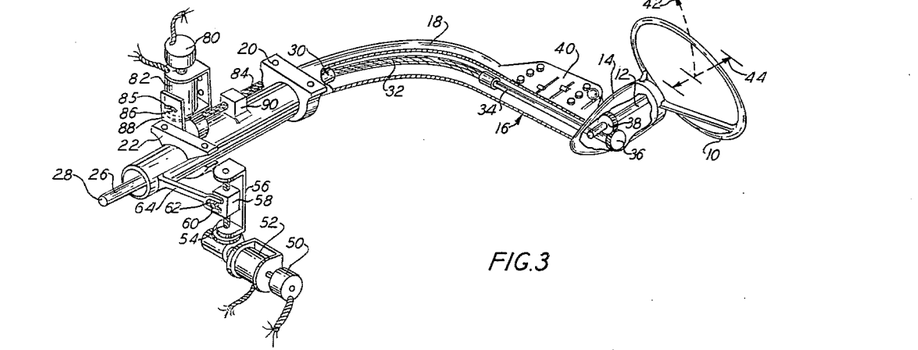
FIGURE 3 is a perspective drawing of the steering column assembly.

Referring to FIGURES 1 to 3, the steering structure of the invention comprises a deep dish steering wheel 10 rigidly attached to the shaft 12 rotatably mounted in the conically shaped housing 14. The steering wheel 10 may be considered a means for controlling the direction of a vehicle, or even more broadly, a control means. The housing 14 is a molded plastic construction formed as an integral part of the steering column tube 16. The steering column tube 16 takes the form of a rigid plastic or metal housing having a right angular bend 18. The bend 18 may be shaped and proportioned so that the steering column tube 16 enters at any point along the dashboard. A pair of brackets or bearings 20 and 22 are attached to the automotive vehicle body structure and are adapted to slidably and rotatably support the steering column tube 16. A shaft 26 is located within the steering column tube 16. This shaft 26 has one end 28 that is attached to a steering linkage mechanism. Its other end 30 is connected to a flexible shaft member 32 that is in turn connected to a shaft member 34 which is drivingly engaged to the shaft 12 by a pair of gears 36 and 38. The shafts 26, 32 and 34 are supported in the steering column tube 16 by suitable bearings (not shown).

The above described steering column tube construction has a number of advantages. Since this construction may be proportioned to enter the dashboard at any point, it enhances the design flexibility afforded the steering linkage designer as the cooperating steering linkage mechanism may be located at any desired position. The portion of the steering tube that is exposed to the passenger compartment could, of course, be padded and form a padded stop that would prevent passengers adjacent the operator from being hurled through the windshield in the case of a sudden stop. The steering column tube 16 may also form a support and housing for other controls such as the movable control console indicated at 40. This control console may contain any of the vehicle controls such as the transmission controls, windshield wiper controls, or heater controls. The steering column configuration when combined with the control console gives the steering wheel a unique floating appearance.

Figure 4:
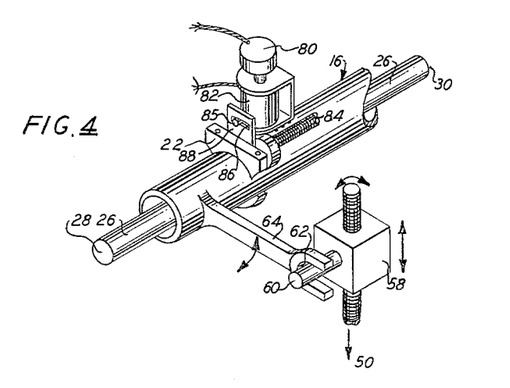
FIGURE 4 is an enlarged perspective drawing of the portion of the steering column assembly that moves the steering column in a plurality of directions.

From the above description of the steering column tube 16 it can be seen that the entire steering column structure may be rotated in the bearings 20 and 22 as indicated by the arrow 42 or moved axially in the bearings as indicated by the arrow 44. In order to accomplish this movement, a power actuator or power operated means such as motors 50 and 80 are provided. The power operated means or power actuator may be interpreted as including the associated steering column structure, that is, the mechanical structure that connects the motors 50 and 80 to the steering wheel or directional control means 10.

More specifically, the motor 50 is mechanically connected to a gear reducing unit 52 that has an output worm gear 54. The worm gear 54 is supported in the bearing structure 56 and it carries a ball nut 58. The ball nut 58 moves along the axis of the worm gear 54 when the worm gear is rotated. The ball nut 58 has a pin 60 that cooperates with the slot 62 in the yoke or arm 64. The arm 64 is rigidly attached to the steering column tube 16. While the arm 64 is indicated as being attached at the lower end of the steering column tube it may be attached at any point along the steering column tube that the particular design requires. The pin-slot connection 60, 62 converts the linear movement of the ball nut 68 to rotary movement of the arm 64. This rotary movement of the arm 64 causes the steering column tube 16 to rotate as indicated by the arrows 42. It should be apparent that any rotation of the motor 50 will in turn rotate the steering wheel 10 in a vertical and transverse direction. The entire assembly 50–60 is mounted on the vehicle body so that it may move with the steering column in an axial direction as indicated by the arrows 44. For example, the top portion of bearing structure 56 and the lower portion of gear reducing unit 52 could be welded or secured to rollers or pins that slide axially in channel-shaped tracks secured to the vehicle frame. Other known suitable slide means could alternately be used.

The power means or motor 80 is connected to a gear reduction device 82 that has a worm gear output shaft 84. The motor 80 and the gear reduction device 82 are fixed against axial movement along the steering column tube 16 by a pin 85 that is slidably mounted in a slot 86 of a support plate 88. The support plate 88 is fixed to the member 22 which is in turn fixed to the vehicle body structure. The pin member 85 has a head portion on the outside of the slot that is larger than the slot, thereby preventing axial movement of the motor 80 and the gear reduction device 82, but allowing the motor 80 and the gear reduction device 82 to be slidingly rotated in the slot 86. A ball nut 90 is rigidly fixed to the steering column tube 16 and drivingly engaged by worm gear 84. The rotation of the motor 80 will cause the worm gear 84 to rotate and thereby move the ball nut 90 along its axis. Since the ball nut 90 is fixed to the steering column tube 16, its movement along the axis of the worm gear 84 will be transmitted to the steering column tube 16, thereby moving the steering wheel 10 in the direction indicated by the arrows 44. It should be noted that the rotation of the motor 50 to rotate the steering column tube 16 will also rotate the ball nut 90. This rotation of the ball nut 90 will in turn be transmitted to the gear reduction device 82 and the motor 80 so that they rotate as a unit in the slot 86, not altering the axial position of the steering wheel 10.

The control circuit or control means for operating the motors 50 and 80 is shown in FIGURES 5 through 9. This circuit, generally designated as 100, functions to permit the steering wheel or steering column to be selectively positioned in the vertical, horizontal, axial or transverse position depending on the particular construction of the power moving means. The control circuit 100 also functions to sense when the operator is about to alight from the vehicle and then automatically positions the steering wheel in a position remote from the operator, thereby enabling the operator to freely move from the vehicle. When the operator's return to the vehicle is sensed, the control circuit automatically returns the steering wheel to the position previously selected by the operator.

Figure 5:
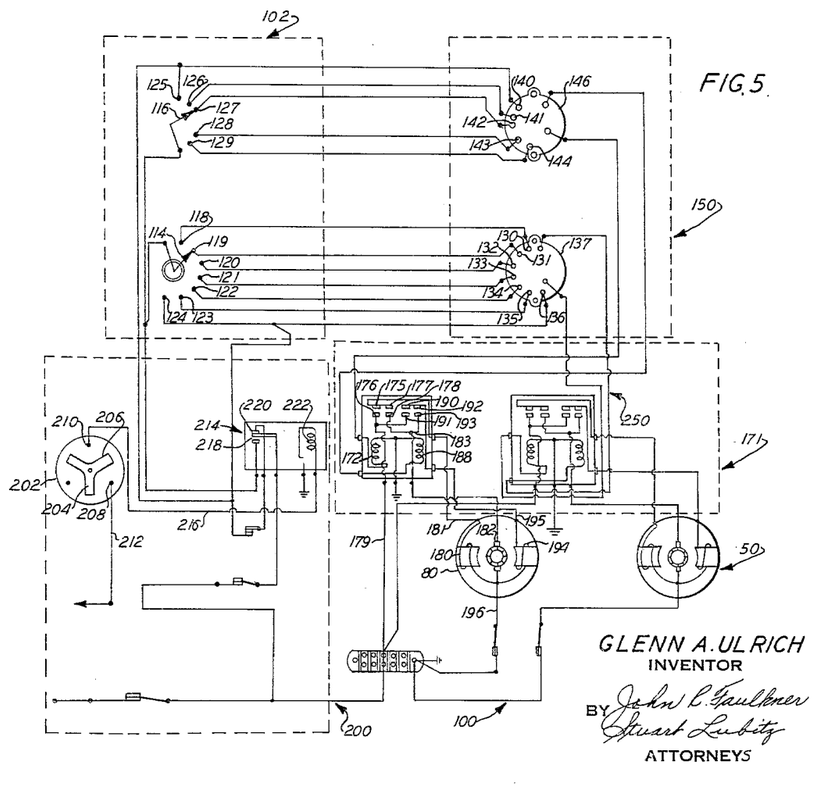
FIGURE 5 is a schematic diagram of the control circuitry.

Referring particularly to FIGURES 2 and 5, the control circuit 100 is provided with a selector device or manual control means 102 for controlling the power operated means or motor 50 or 80. This selector device 102 includes a pair of selector dials 104 and 106 that are placed on the dashboard and may be independently adjusted to a plurality of positions (FIGURE 2). In the illustrated embodiment the dial 104 may be adjusted to select any of seven vertical positions while the dial 106 may be adjusted to select any of five horizontal positions. The dials 104 and 106 have pointers 108 and 110 that cooperate with the indicating elements 112.

The selector device 102 also has conductive dials 114 and 116 and conductive contacts 118 to 124 and 125 to 129 that are constructed to correspond with the positions of dials 104 and 106 and with the position of indicating elements 112, respectively (FIGURE 5). The conductive dials 114 and 116 are mechanically connected to the selector dials 104 and 106 and are adapted to move over and make electrical contact with the contacts 118 to 124 and 125 to 129, respectively. The contact 124 corresponds to the steering wheel vertical position furthest away from the operator of the vehicle while the contact 125 corresponds to the steering wheel horizontal position furthest away from the operator. These two contacts may be considered a first means for limiting the movement of the steering column means in one direction. This will be fully described later in the specification.

The contacts 118 to 124 are connected to a plurality of contacts 130 to 136 on a switch wafer 137. The contacts 125 to 129 are similarly connected to the contacts 140 to 144 of a switch wafer 146. The contacts 130 to 136 and 140 to 144 have conductive portions on both sides of the wafers 137 and 146. The switch wafers 137 and 146 and the associated contacts thereon form part of position responsive device 150.

Each of the sets of contacts 130 to 136 and 140 to 144 and their conductive portions cooperate with a pair of plates that are adapted to be rotated and slide over the conductive portions of contacts making electrical contact with these contacts. A pair of the plates 156 and 158 are shown in FIGURES 6 through 9 cooperating with the contacts 140 to 144 on wafer 146. One of the plates is located on one side of the switch wafer to cooperate with the conductive portions of the contacts on that side of the wafer while the other plate is located on the other side of the switch wafer to cooperate with the conductive portions of the contacts on that side of the wafer. In these figures the plate 156 is shown in solid lines while the plate 158 is shown in broken lines. This is done in order to avoid confusion.

The plates 156 and 158 are made of a conductive material and rotatably mounted so that they may be driven by the motor 80. The dash line 160 is intended to schematically indicate a mechanical driving connection between the motor 80 and the plates 156 and 158. The plate 156 is mechanically connected to the motor 80 so that its rotation is limited to an arc encompassing contacts 141 through 144 while the plate 158 is rotated through an arc encompassing contacts 140 to 143. The plates 156 and 158 have rim portions 162 and 164 that are angularly aligned in overlapping fashion so that a gap 166 will exist between these rim portions. The gap functions to sequentially uncover the contacts 140 to 144 as the plates 156 and 158 are rotated in the same direction by the motor 80. This opening or uncovering of the contacts 140 to 144 serves to open the circuit from the conductive dial 116. The pair of plates cooperating with the contacts 130 to 136 on wafer 137 are not shown, but are similarly constructed and connected to the motor 50 and similarly cooperate with the contacts on the switch wafer 137.

The above described plates 156 and 158 and their associated contacts may be considered a position responsive device 150 that is connected with the selector device 102 are driven by the power means or motor 80. Alternatively, it will be seen that the plates 156 and 158 may be considered to cooperate with the conductive dial 116 to function as a second means adjustable upon the operation of the power means of motor 80 by said manual means or selector device 102 for limiting the movement of the steering wheel or steering column in one direction. These broad descriptions of the above-described detailed structure are set forth to indicate that the invention is not limited to the specific structure described.

In addition to cooperating with the contacts 141 to 144, the plate 156 is continually electrically connected to the contact 168 while the plate 158 is continually electrically connected to the contact 170. The contact 168 is connected to the relay coil 172 that is part of the motor control means 171. The coil 172, when energized, closes the switch contacts 175–178. The contact 175 is connected to the field winding 180 of the motor 80 via conductor 181 while the contact 176 is connected to the vehicle generating system via the conductor 179. The contact 177 is connected to the vehicle generating system via contacts 175 and 176 and conductor 179. The contact 178 is connected to the brush-armature assembly 182 via the conductors 183 and 184. The brush-armature assembly 182 is connected to ground via the conductor 196. The closing of the contacts 175 and 176 will cause the field winding 180 that is connected to ground by conductor 196 to be energized via the conductor 181 while the closing of contacts 177 and 178 will energize the armature 182 via the conductors 183 and 184, thereby causing the motor to rotate.

The contact 170 which is continually electrically connected to the plate 158 is connected to the relay coil 188 via the conductor 186. The coil 188, when energized, will cause a plurality of contacts 190 to 193 to close. The closing of the contacts 190 and 191 causes a field winding 194 to be energized via the conductor 195 while the closing of the contacts 192 and 193 causes the armature 182 to be energized via the conductor 184.

When the field winding 180 is energized, the motor will rotate in a counterclockwise direction as will the plates 156 and 158. When the field winding 194 is energized, the motor will rotate in a clockwise direction as will the plates 156 and 158.

The relay and associated contacts 250 are identical to the relay and contact structure 172–178 and 188–193. The switch wafer 137, its two plates similar to plates 156, 158, and relay structure 250 control the motor 50 in the same way that motor 80 is controlled by the above described relay structure.

The contact and relay structure described in the preceding paragraph may be considered a relay means or a motor control means that is connected with or adapted to be connected to the position responsive device 150, or plates 156, 158 and responsive to the positional disagreement of the selector device 102 and a position responsive device 150 for causing energization of the power or motor means 80. Alternatively, it may be regarded as part of the control means for selectively positioning the steering wheel by energizing the power means 80.

The final portion of the control circuit 100 is the override device or sensing means, generally shown at 200. The override device or sensing means 200 may be considered a portion of a means for energizing the power operated means 50 to move within its range of movement when the operator is about to leave the car. This sensing means comprises a switch 202 that may form part of the vehicle ignition switch. This switch contains a plurality of conductive arms 204 and 206 that are adapted to conductively bridge the contacts 208 and 210 when the ignition switch is rotated in a counterclockwise direction. This conductive bridging of the contacts 208 and 210 connects a conductor 212 that is connected to a vehicle generating system to a relay means 214 and more specifically coil 222 via the conductor 216. The relay means 214 includes a pair of normally open contacts 218 that connect the conductive selector dials 114 and 116 to the vehicle generating system. A pair of normally closed contacts 220 that, when closed, connect the vehicle generating system to the contacts 136 and 140 are also part of the relay means 214.

It should be apparent that when the ignition switch 202 is rotated in a counterclockwise direction the vehicle generating system will energize the relay coil 222 thereby closing the contacts 218 and opening the contacts 220. This connects the selector dials 114 and 116 to the vehicle generating system and causes the current to flow to one of the contacts 118 to 124 and to one of the contacts 125 to 129. The contacts 118–124 and 125–129 may then distribute the current to the motors 50 and 80 via the position responsive means 150 and the motor control means 171. The current will only reach the motor if there is positional disagreement between the position responsive device 150 and the selector device 102.

Figure 6:
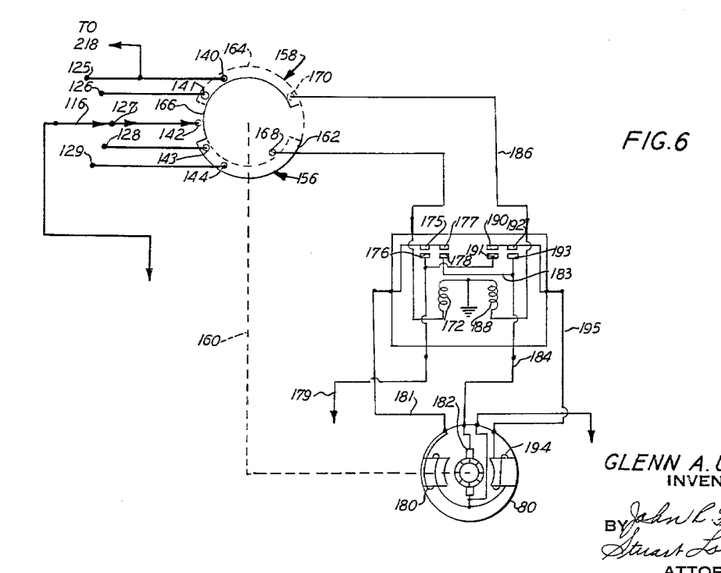
FIGURES 6 to 9 are schematic diagrams showing the operation of a portion of the control circuit with the selector switch in different positions.

When the switch arm 204 is in the position shown in FIGURE 5, the contacts 220 are closed and the vehicle generating system is connected directly to the contacts 136 and 140. If the gap 166 (FIGURES 6–9) is not positioned over the contact 140, the current applied to the contact 140 will pass through the plate 158 to the contact 170 and to the relay coil 188. The energizing of the relay coil 188 causes the contacts 190 through 193 to close resulting in the field winding 194 being connected to the vehicle generating system via the conductor 179, the contacts 190–193 and the conductor 195. The closing of the contacts 192 and 193 energizes the armature 182. The energization of the armature 182 and the field winding 194 results in the motor 80 rotating in a clockwise direction and in turn rotating the plate 158 in a clockwise direction. The movement of the motor 80 in the clockwise direction causes the ball nut 90 to move horizontally and thereby move the steering wheel in a horizontal direction away from the operator. The plates that cooperate with the contact 136 of the wafer switch 137, the relay means 250, and the motor means 50 in the same way as the plates 156 and 158 cooperate with the contact 140, the relay means 172–179 and 188–195, and the motor means 80. The operation of the movable steering wheel system will now be considered. Assume that the dial 110 of the horizontal selector device is in the position "c" (FIGURE 2). The conductive dial 116 would then be in the position shown in FIGURE 6. The turning of the ignition switch 202 in a counterclockwise direction to an "on" position energizes the relay coil 222 to close the normally open contacts 218 and thereby apply a current to the selector dial 116. The current passing from the dial 116 through the contact 127 will be open circuited by the gap 166 that overlies the contact 142 (FIGURE 6). This open circuiting of the contact 142 will cause the contacts 175 through 178 and 190 through 193 to remain open thereby preventing the motor 80 from being energized. It is apparent that with the conductive dial 116 in the position shown in FIGURE 6 and the plates 156 and 158 in the positions indicated therein, the movable steering column will then be at rest. This indicates that there is positional agreement between the selector dial, the position responsive device and the steering wheel.

Figure 7:
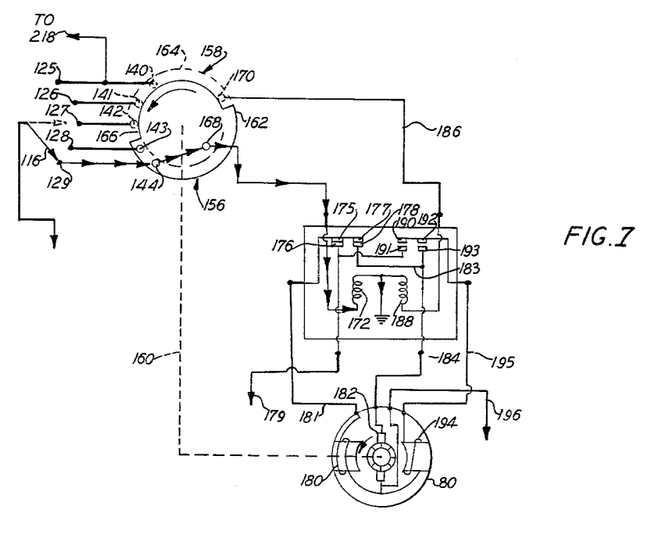
Figure 8:
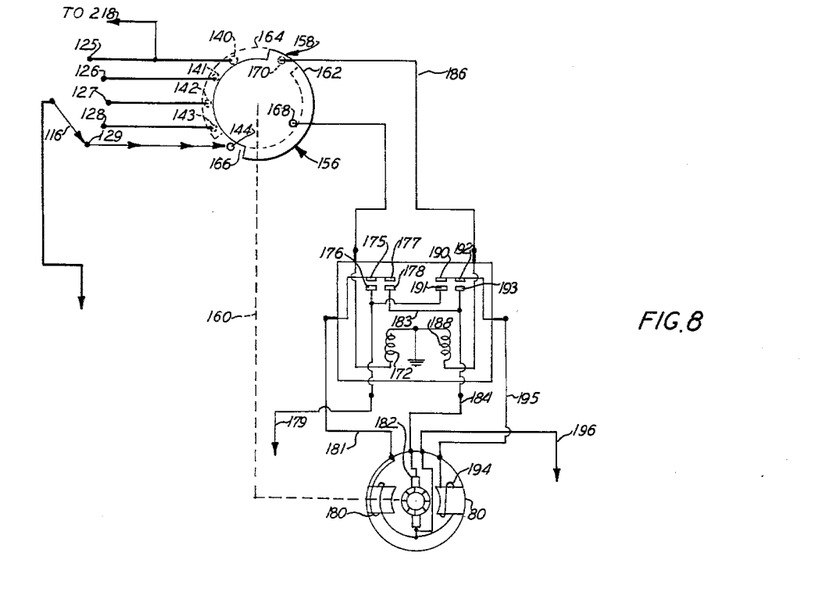
Figure 9:
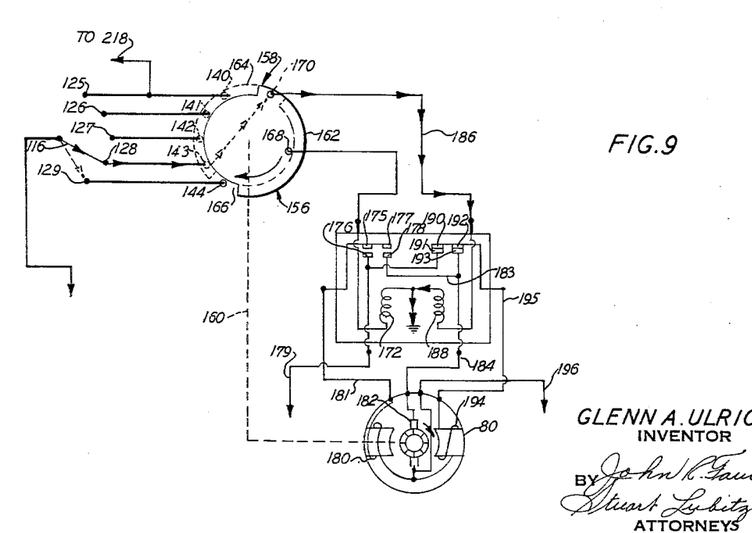

Assume that the horizontal selector dial 110 is moved from position "c" to position "e" as shown in FIGURE 7. In this position the conductive dial 116 is electrically connected to the contact 129 which in turn is electrically connected to the contact 144. The contact 144 is slidingly and electrically engaged by the conductive plate 156 that is also in continuous sliding electrical contact with the contact 168 which is connected to the relay coil 172. With the ignition switch 202 rotated counterclockwise to an "on" position, the vehicle generating system will complete a circuit to the relay coil 172 via the switch arms 204 and 206 (FIGURE 5), the contacts 208, 210, relay 222, and contacts 218, the selector dial 116, the contacts 129 and 144, the conductive plate 156 (FIGURE 7) and the contact 168, thereby energizing the relay coil 172. This energizing of the relay coil 172 closes the contacts 175 through 178, thereby energizing the field winding 180 and the armature 182. This causes the motor 80 to rotate the worm gear 84 in a counterclockwise direction that causes the steering wheel to move away from the dashboard and toward the vehicle operator. As the worm gear 84 rotates, the conductive plates 156 and 158 will also rotate in a counterclockwise direction until the contact 144 is open circuited by the gap 166. The open circuiting of the contact 144 will cause the movable steering column system to come to rest as the current from the vehicle generating system to the motor 80 is discontinued. This at rest position is shown in FIGURE 8.

Assume that the selector dial 110 is now moved from position "e" to position "d" (FIGURE 2). The conductive dial 116 will now be in the position shown in FIGURE 9 and in this position a circuit is completed from the vehicle generating system to the conductive dial 116 as described above. The conductive dial 116 is now connected, however, to the contact 128 which completes a circuit through the contact 143 to the conductive plate 158. The conductive plate 158 is electrically connected to the contact 170 which is in turn connected to the relay coil 188 by the conductor 186 thereby completing a circuit from the vehicle generating means to the relay coil 188. With this circuit completed, the relay coil 188 is energized and closes the contacts 190 through 193. The closing of the contacts 190 through 193 causes the field winding 194 and the armature 182 to be energized. This energization causes the motor output shaft and the plates 156 and 158 to rotate in a clockwise direction until the contact 143 is uncovered by the gap 166. The open circuiting of the contact 143 de-energizes the relay 188 which opens the contacts 190 to 193, thereby de-energizing the field winding and armature. This de-energization causes the steering column assembly to assume a rest position. When this at rest position is assumed, the steering wheel is in a horizontal position closer to the vehicle operator and there is positional agreement between the selector device, position responsive device and steering wheel.

When the ignition switch 202 is turned to the "off" position, as shown in FIGURE 5, the relay coil 222 will be de-energized and the contacts 220 will assume their normally closed position. Simultaneous with the closing of contacts 220 is the opening of contacts 218. The opening of contacts 218 open circuits the selector dials and the conductive dials 114 and 116 while the closing of contacts 220 completes a circuit directly to the contacts 136 and 140. The contact 136 corresponds to the vertical position most remote from the operator while the contact 140 corresponds to the horizontal position most remote from the operator. Assuming that the steering wheel is not already in these remote positions, the closing of contacts 220 will complete a circuit from the contacts 136 and 140 to the motors 50 and 80 in such a manner that the steering wheel is automatically positioned in its most remote position in its vertical and forward position most remote from the operator. More specifically, the energization of motor 80 is accomplished via the contact 140, the conductive plate 158, the contact 170, the relay coil 188, the conductor 186, and the contacts 190 through 193. This circuit causes the field winding 194 and the armature winding 182 to be energized whereby the motor 80 and the conductive plates 156 and 158 rotate in a counterclockwise direction. This rotation continues until the gap 166 uncovers the contact 140 and de-energizes the relay coil 188 which open circuits the armature 182 and field winding 194 of the motor 80. As the motor 80 and the conductive plates 156 and 158 are rotated, the steering wheel will be moved horizontally away from the operator until it reaches its most remote position. At this point the motor 80 is de-energized as the steering wheel comes to rest.

In the above operational description it should be noted that the turning off of the ignition switch 202 is in essence a means for sensing that the operator is about to leave the vehicle. This, of course, is not true in every case, but is generally the situation. It is within the scope of the invention to provide a separate manuel switch for the operator to actuate in order to automatically move the steering wheel to a position remote from the operator so that access to and from the vehicle is facilitated. It is also possible to provide a switch actuated by the door which operates the relay coil 222 and causes the steering wheel to move to its most remote position. With the teachings of the specification in mind, it is readily possible to derive many modifications of the disclosed invention.

An alternate embodiment of the invention is shown in FIGURES 10 through 13. This embodiment of the invention is directed to a steering wheel tiltable at a position in the proximity of the end of the steering column and having a push button selector switch placed on the steering wheel. The significant differences between this system and the system described in FIGURES 1 through 9 will now be described.

Figure 10:
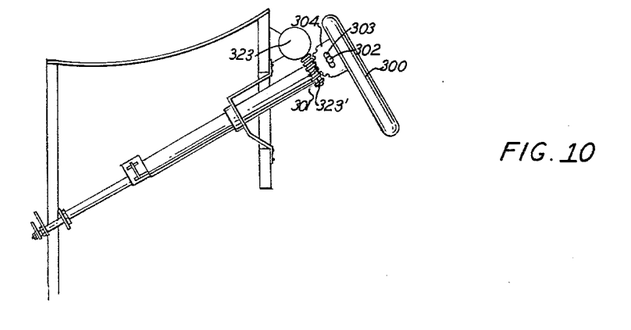
FIGURES 10 to 13 show an alternate embodiment of the invention directed toward a steering wheel tiltable at the end of the steering column.
Figure 11:
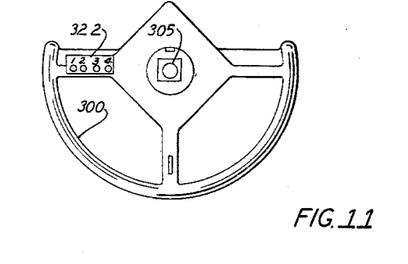
Figure 12:
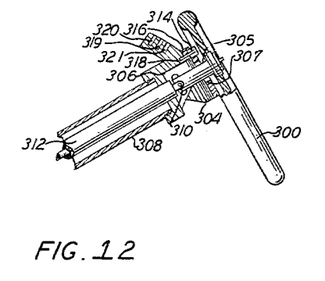

Referring to FIGURES 10-12, this embodiment of the invention includes a steering wheel 300 that is pivotally connected at the end of the steering column 301 adjacent the operator. The pivotal connection at the end of the steering column comprises a support member 306 having a pair of pins (one of which is shown at 302) that are rigidly attached thereto. The pins 302 cooperate with a pair of arcuate slots 303 in a pair of brackets such as the one shown at 304. The brackets 304 are rigidly fastened to the steering wheel. The steering wheel 300 also has a stub shaft 305 that is rigidly attached to it and is rotatably mounted in the bracket 304 by the bearing 307. The shaft 305 has a universal-type joint 310 at its lower end that connects it to the steering shaft 312 which is in turn connected to the steering mechanism of the vehicle. The pivot axis of the joint 310 is substantially aligned with the axis of the pins 302. It can be seen that the steering wheel 300 is adapted to pivot about the pins 302 and the universal joint 310 and is adapted to rotate so that the steering shaft 312 may be actuated. It is within the scope of the invention to utilize any of the usual pivotal connections and to eliminate the pin-slot connection.

The brackets 304 have a solenoid actuated locking mechanism rigidly attached to it and schematically shown at 314. The solenoid locking mechanism 314 has an armature or pin 316 which is biased toward the support member 306 and into one of the apertures 318 321 in the support member 306. The energization of the solenoid locking mechanism 314 causes the armature 316 to move upwardly or toward the vehicle operator thus permitting the steering wheel 300 to be tilted or pivoted about the universal joint 310. When the steering wheel is tilted to a desired position that is coincident to one of the apertures 318–321, the solenoid may be de-energized and the steering wheel 300 locked in position.

The above-described tiltable steering wheel may be manipulated, actuated or unlocked by a manual means. It is preferred, however, as shown in FIGURES 10 and 13, to have the tilting of the steering wheel performed by the motor 323 that is controlled by the same circuitry described above and shown in FIGURE 5 with the exception that a push-button selector switch 322 replaces the rotatable selector switch shown in FIGURE 2.

Figure 13:
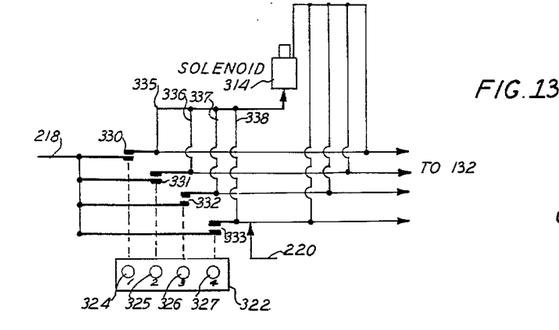

It will also be clear, however, that the tiltable steering wheel of the FIGURES 10–13 embodiment can be combined with the vertically and horizontally movable steering column of the FIGURES 1–9 embodiment, rather than replace it, merely by replacing the fixed steering wheel 10 of FIGURE 1 with the tilting wheel and actuating mechainsm of FIGURE 10, and incorporating the circuitry of FIGURE 13 into the FIGURE 5 circuitry. That is, lines 218 and 220 indicated in FIGURE 13 would be connected to the corresponding lines in FIGURE 5 in parallel to the lines leading from contacts 218 to the conductive dials 114 and 116 and contacts 220 to contacts 140 and 136. The lines indicated "to 132" in FIGURE 13 would be connected to an additional motor control wafer similar to 137 or 146 in control 150, and a relay control for motor 323 would be provided in control 171. The wafer would have four contacts corresponding to the four tilt positions, actuation of any one push button 324 to 327 connecting the circuit to the motor 323 in a manner similar to that described in connection with the FIGURE 5 circuitry to rotate the wafer upon rotation of the motor until the gap opens the circuit. The most remote position would be actuated by the circuit through contacts 220 bypassing the switches 330–333 when the ignition is turned off.

Referring to FIGURE 13, the push-button selector switch 322 includes push buttons 324–327 which control four pairs of normally open contacts 330–333, respectively. The contacts 330–333 are connected to the switch wafer 137 or 146 as shown in FIGURE 5. The contacts 330–333 are also connected via the conductors 335–338, respectively, to the solenoid of the solenoid locking mechanism 314. The solenoid is in turn electrically connected to the switch wafer 137 or 146 and to the same contacts on the switch wafer that the associated contacts 330–333 are connected to.

In operation the depression of one of the push buttons such as 325 completes a circuit from the relay means 214 through the contacts 331 to a contact such as contact 134 on the switch wafer 137. This also completes a circuit from the relay means 214 to the solenoid 314 and to a contact such as 134. Assuming the tiltable steering wheel to be in a position other than that represented by the push button 325, the solenoid locking mechanism 314 would be energized, unlocking the tiltable steering wheel. Meanwhile, the motor 323 would be energized and would then result in the tilting of the steering wheel 300 via the worm gear connection 323'. The steering wheel 300 would be tilted to the position corresponding with the push button 325 at which time the motor and solenoid are de-energized. The de-energization of the solenoid locks the steering wheel in place. The other aspects of the circuit operation are evident from the previous description of the circuit shown in FIGURE 5.

From the above detailed description it is apparent that a steering wheel that may be selectively positioned to a comfortable operating location has been provided. In order to minimize operator fatigue, this steering wheel selectivity is accomplished by a finger tip control and a power operated means. This system also provides a steering wheel and a steering column that automatically moves to a position remote from the operator when it is sensed that the operator is about to alight from the vehicle and that automatically returns to the previously selected position when the operator re-enters the vehicle and is seated. The steering wheel and steering column of this invention also provide a built-in safety feature and a surface to accommodate other controls for selective positioning.

It will be understood that the invention is not to be limited to the exact construction shown and described, but that various changes and modifications may be made without departing from the spirit and scope of the invention as defined in the appended claims.

I claim:

1. An adjustable steering mechanism for a motor vehicle, comprising, in combination, steering means for determining the direction of movement of said vehicle, a steering column, means pivotally securing said steering means to said column for tilting thereof to a plurality of positions, power means for tilting said steering means, and selectively operable tilt position selective control means connected to said power means for automatically actuating the same to tilt said steering means to positions selected by said control means.

2. An adjustable steering mechanism for a motor vehicle, comprising, in combination, a rotatable steering wheel for determining the direction of movement of said vehicle, a steering column, means pivotally securing said steering wheel to said column for tilting thereof to a plurality of positions, power means for tilting said steering wheel, and selectively operable tilt position selective control means connected to said power means for automatically actuating the same to tilt said steering wheel to positions selected by said control means.

3. An adjustable steering mechanism for a motor vehicle, comprising, in combination, steering means for determining the direction of movement of said vehicle, a steering column, means mounting said column for both rotational and axial sliding movements, and means securing said steering means to said column at a location offset from the rotational axis of said column whereby rotational and axial movements of said column effects an arcuate movement of said steering means in lateral and axial directions.

4. An adjustable steering mechanism for a motor vehicle, comprising, in combination, steering means for determining the direction of movement of said vehicle, a steering column, means mounting said column for both rotational and axial sliding movements, and means securing said steering means to said column at a location offset from the rotational axis of said column whereby simultaneous rotational and axial movements of said column effects an arcuate movement of said steering means simultaneously in both lateral and axial directions.

5. An adjustable steering mechanism for a motor vehicle, comprising, in combination, steering means for determining the direction of movement of said vehicle, a steering column, means mounting said column for both rotational and axial sliding movements, means tiltably securing said steering means to said column at a location offset from the rotational axis of said column, and common control means for operably tilting said steering means to selected positions and rotating and axially moving said column whereby rotational and axial movements of said column effects an arcuate movement of said steering means in combined axial and lateral directions.

6. An adjustable steering mechanism for a motor vehicle, comprising, in combination, steering means for determining the direction of movement of said vehicle, a steering column, means mounting said column for both rotational and axial sliding movements, means tiltably securing said steering means to said column at a location offset from the rotational axis of said column, power means for simultaneously tilting said steering means and rotating and axially moving said column to a plurality of positions, and common control means for actuating said power means whereby rotational and axial movements of said column effects an arcuate movement of said steering means in combined axial and lateral directions.

7. An adjustable steering mechanism for a motor vehicle, comprising, in combination, steering means for determining the direction of movement of said vehicle, a steering column, means mounting said column for both rotational and axial sliding movements, means tiltably securing said steering means to said column at a location offset from the rotational axis of said column, power means for simultaneously tilting said steering means and rotating and axially moving said column to a plurality of positions, and common control means for simultaneously actuating said power means whereby simultaneous rotational and axial movements of said column effects an arcuate movement of said steering means in combined axial and lateral directions.

8. An adjustable steering mechanism for a motor vehicle, comprising, in combination, steering means for determining the direction of movement of said vehicle, means mounting said steering means for both axial and lateral movements to a plurality of selective positions, power means for effecting said movements, and control means for actuating said power means, said control means including first position selection means for actuating said power means to move said steering means to selected positions corresponding to the setting of said position selective means, said control means including other means movable between positions for controlling the operability of said position selection means, movement of said other means to one position rendering said position selection means inoperative and actuating said power means to effect movement of said steering means to a predetermined set of positions, movement of said other means to another position rendering said position selective means operative to return the steering means to the positions selected by said position selection means.

9. An adjustable steering mechanism for a motor vehicle, comprising, in combination, steering means for determining the direction of movement of said vehicle, a steering column, means pivotally securing said steering means to said column for tilting movements relative thereto to a number of selective positions, means mounting a portion of said column for both axial and lateral movements to a plurality of selective positions, power means for effecting said movements, and control means for actuating said power means, said control means including first position selection means for actuating said power means to move said steering means and column to selected positions corresponding to the setting of said position selective means, said control means including other means movable between positions for controlling the operability of said position selection means, movement of said other means to one position rendering said position selection means inoperative and actuating said power means to effect movement of said steering means and column to a predetermined set of positions, movement of said other means to another position rendering said position selective means operative to return the steering means and column to the positions selected by said position selection means.

10. An adjustable steering mechanism for a motor vehicle, comprising, in combination, steering means for determining the direction of movement of said vehicle, a steering column, pivotal means tiltably securing said steering means to said column for tilting movements relative thereto to a number of selective positions, means mounting said column for both axial and rotational movements to a plurality of selective positions, said pivotal means securing said steering means to said column at a location offset from the rotational axis of said column whereby rotational and axial movements of said column effects an arcuate movement of said steering means in combined axial and lateral directions, power means for effecting said movements, and control means for actuating said power means, said control means including first position selection means for actuating said power means to move said steering means and columns to selected positions corresponding to the setting of said position selective means, said control means including other means movable between positions for controlling the operability of said position selection means, movement of said other means to one position rendering said position selection means inoperative and actuating said power means to effect movement of said steering means and column to a predetermined set of positions, movement of said other means to another position rendering said position selective means operative to return the steering means and column to the positions selected by said position selection means.

11. An adjustable steering mechanism for a motor vehicle, comprising, in combination, steering means for determining the direction of movement of said vehicle, a steering column, means mounting said column for both axial and rotational movements to a plurality of selective positions, means securing said steering means to said column at a location offset from the rotational axis of said column whereby rotational and axial movements of said column effects an arcuate movement of said steering means in combined axial and lateral directions, power means for effecting said movements, and control means for actuating said power means, said control means including first position selection means for actuating said power means to move said steering means and column to selected positions corresponding to the setting of said position selective means, said control means including other means movable between positions for controlling the operability of said position selection means, movement of said other means to one position rendering said position selection means inoperative and actuating said power means to effect movement of said steering means and column to a predetermined set of positions movement of said other means to another position rendering said position selective means operative to return the steering means and column to the positions selected by said position selection means.

12. An adjustable steering mechanism for a motor vehicle, comprising, in combination, a steering means for determining the direction of movement of said vehicle, a steering column, means pivotally securing said steering means to said column for tilting movements relative thereto to a number of selective positions, means mounting said column for both axial and rotational movements to a plurality of selective positions, power means for effecting said movements, and control means for actuating said power means, said control means including electrical circuits when energized actuating said power means, first operator controlled position selection switch means for actuating said power means to move said steering means and column to any of several selective positions corresponding to the setting of said position selective switch means, said control means including vehicle ignition control means movable between on and off positions for controlling the operability of said position selection switch means, movement of said ignition means to an off position interrupting the circuit from said switch means to said power means and completing an auxiliary circuit to said power means to effect movement of said steering means and column to predetermined positions, movement of said ignition means to an on position interrupting the auxiliary circuit and again completing the circuit from said swtch means to said power means rendering said power means to return the steering means and column to the positions selected by said position selection switch means.

(References on following page)

References Cited by the Examiner

UNITED STATES PATENTS

| | | | |
|---|---|---|---|
| 1,367,695 | 2/21 | Gray | 74—493 |
| 1,425,723 | 8/22 | Thomas | 74—493 |
| 2,769,351 | 11/56 | Serfling et al. | 74—493 |
| 2,836,988 | 6/58 | Cashman | 74—493 |
| 2,910,887 | 11/59 | Helms | 74—493 |
| 2,945,722 | 7/60 | Horton | 248—429 |
| 2,982,335 | 5/61 | Garvey | 248—424 |
| 3,072,231 | 1/63 | Iding | 248—419 |
| 3,078,945 | 2/63 | Frey | 180—78 |

FOREIGN PATENTS 883,130  11/61  Great Britain.

BENJAMIN HERSH, *Primary Examiner.*

KENNETH H. BETTS, MILTON BUCHLER,
*Examiners.*